(12) United States Patent
Wang et al.

(10) Patent No.: US 12,076,828 B1
(45) Date of Patent: Sep. 3, 2024

(54) POP-UP PUSH STOP

(71) Applicants: Henry Wang, Winter Springs, FL (US); Ralph Bagnall, Orlando, FL (US)

(72) Inventors: Henry Wang, Winter Springs, FL (US); Ralph Bagnall, Orlando, FL (US)

( * ) Notice: Subject to any disclaimer, the term of this patent is extended or adjusted under 35 U.S.C. 154(b) by 0 days.

(21) Appl. No.: 18/642,959

(22) Filed: Apr. 23, 2024

(51) Int. Cl.
*B23Q 1/64* (2006.01)

(52) U.S. Cl.
CPC ..................... *B23Q 1/64* (2013.01)

(58) Field of Classification Search
CPC .. B23Q 1/64; B23Q 1/42; B23Q 3/102; B27B 27/04; B27B 27/08; B27B 27/10; Y10T 83/7613; Y10T 83/7593; Y10T 83/8773
See application file for complete search history.

(56) References Cited

U.S. PATENT DOCUMENTS

| | | | |
|---|---|---|---|
| 2,890,729 A | | 6/1959 | Horn |
| 4,782,871 A | | 11/1988 | Aigner |
| 4,901,992 A | | 2/1990 | Dobeck |
| 4,934,678 A | * | 6/1990 | Bernier ............... B27B 27/08 269/303 |
| 5,040,443 A | | 8/1991 | Price |
| 5,443,554 A | * | 8/1995 | Robert ............... B27B 27/04 269/304 |
| 5,516,089 A | * | 5/1996 | Seniff .................. B23Q 3/102 269/304 |
| 5,617,909 A | * | 4/1997 | Duginske ............ B27B 27/10 403/381 |
| 5,695,178 A | * | 12/1997 | Lenzkes .............. B25B 5/006 269/93 |
| 5,768,966 A | | 6/1998 | Duginske |
| 5,845,555 A | | 12/1998 | Dawley |
| 7,228,774 B2 | | 6/2007 | Stolzer |
| 7,483,765 B2 | | 1/2009 | Dick et al. |
| D965,405 S | | 10/2022 | Duxbury |
| 11,485,042 B1 | * | 11/2022 | Duxbury ............. B27B 27/08 |
| 11,833,707 B2 | | 12/2023 | Duxbury |
| 2015/0082962 A1 | | 3/2015 | Lin |
| 2020/0215623 A1 | | 7/2020 | Duginske |
| 2021/0078196 A1 | | 3/2021 | Pierluigi |
| 2024/0051175 A1 | | 2/2024 | Duxbury |

* cited by examiner

*Primary Examiner* — Seahee Hong
(74) *Attorney, Agent, or Firm* — Wolter Van Dyke Davis, PLLC; Robert L. Wolter

(57) ABSTRACT

A push stop (100) for use in a slot disposed in a worksurface includes: a body (102), a resilient element (104), and an anchor assembly (106). The anchor assembly is configured to anchor a first portion (110) of the body in a fixed anchored position within the slot. A resilient force exerted by the resilient element urges a second portion (114) of the body into a fixed raised position in which the second portion protrudes beyond the worksurface. When an external force sufficient to overcome the resilient force is applied, the resilient element yields until none of the second portion protrudes beyond the worksurface.

24 Claims, 12 Drawing Sheets

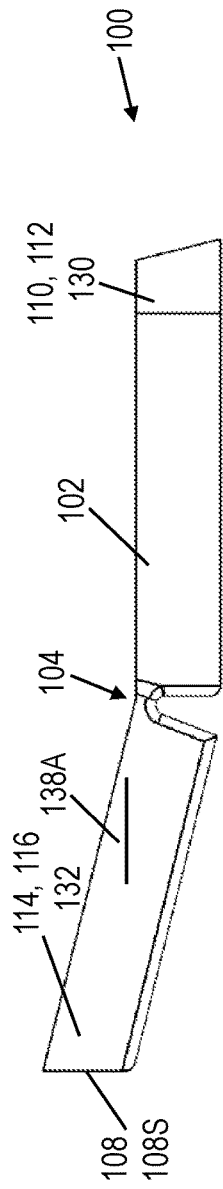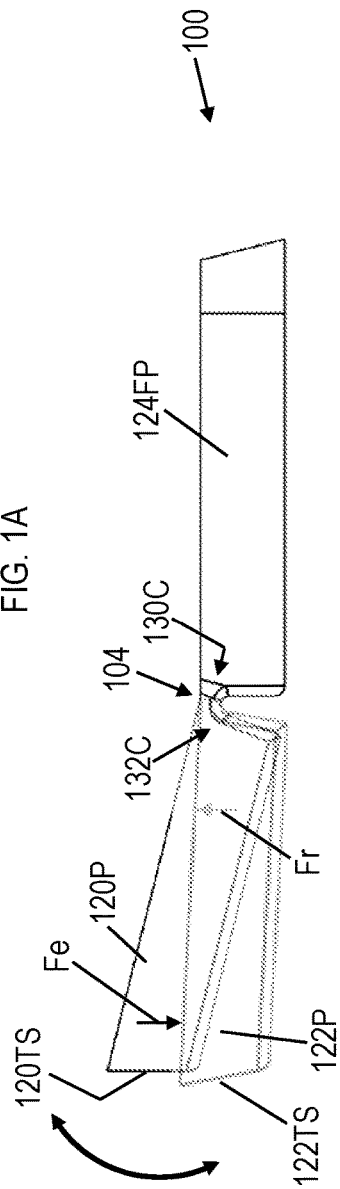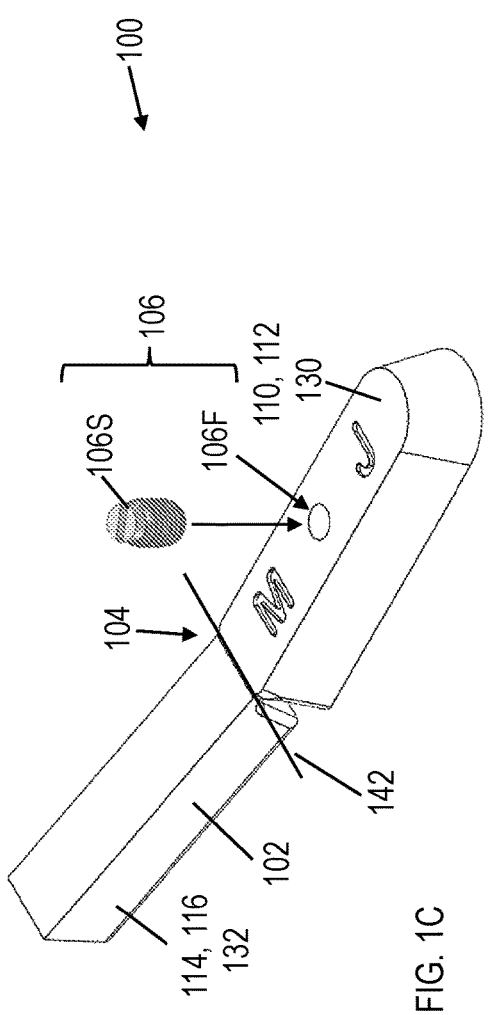

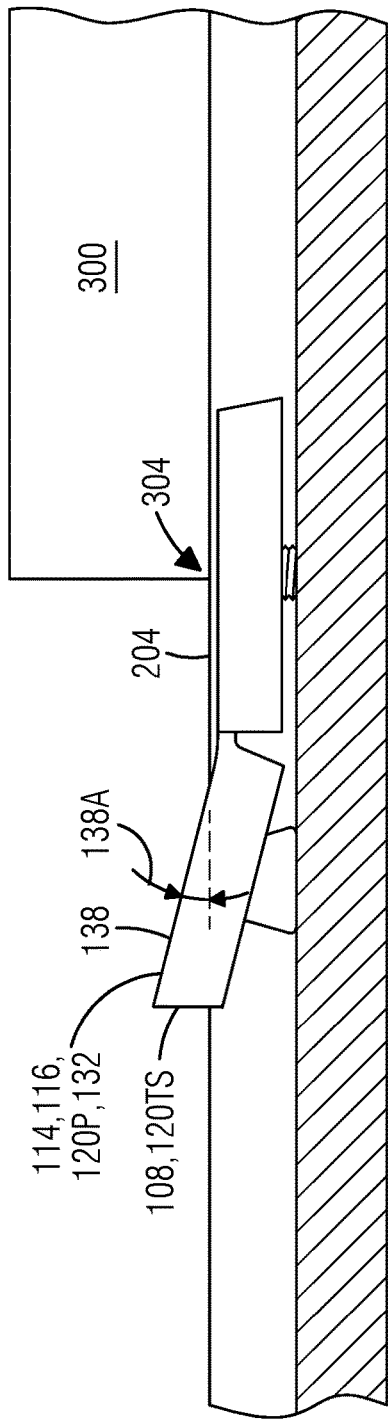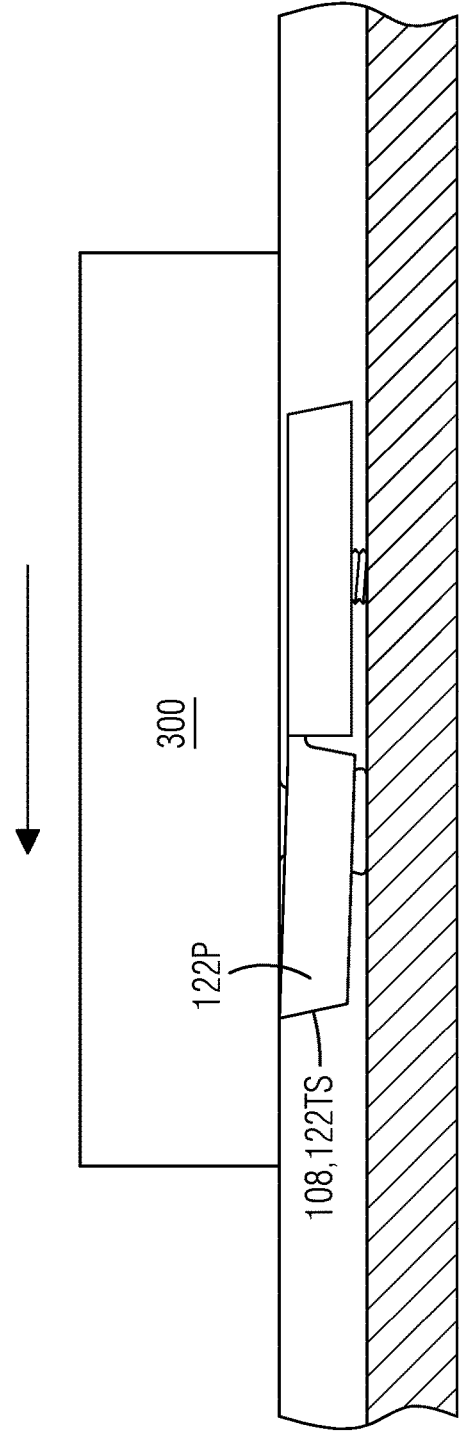
FIG. 4A
FIG. 4B

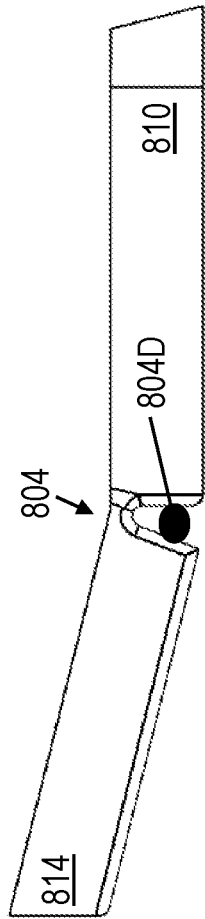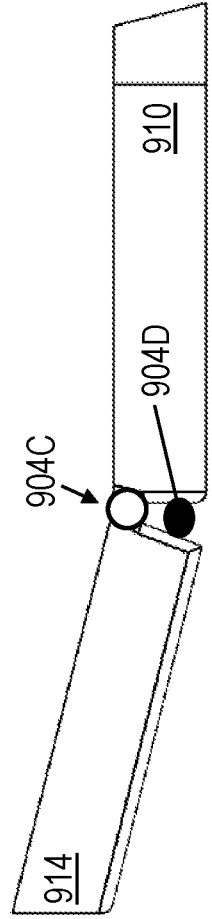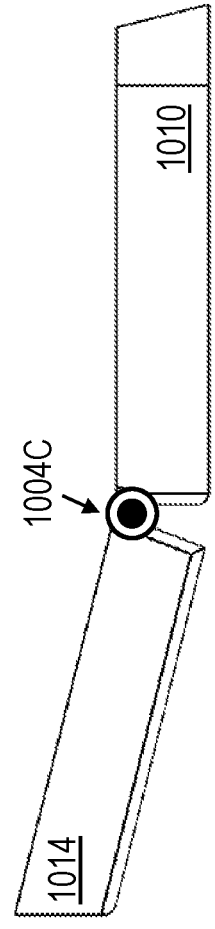

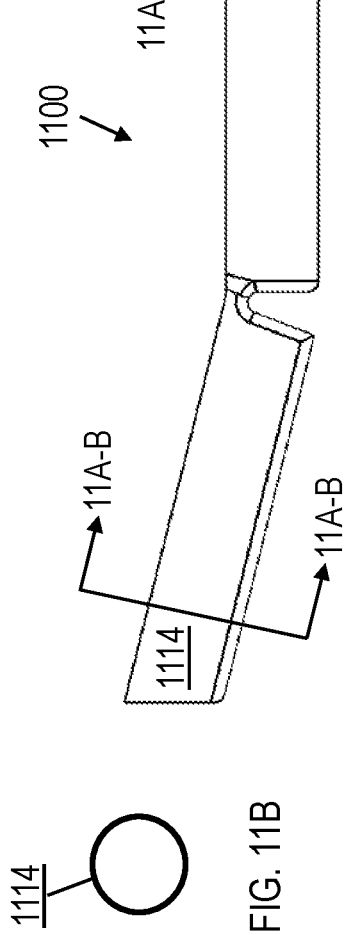
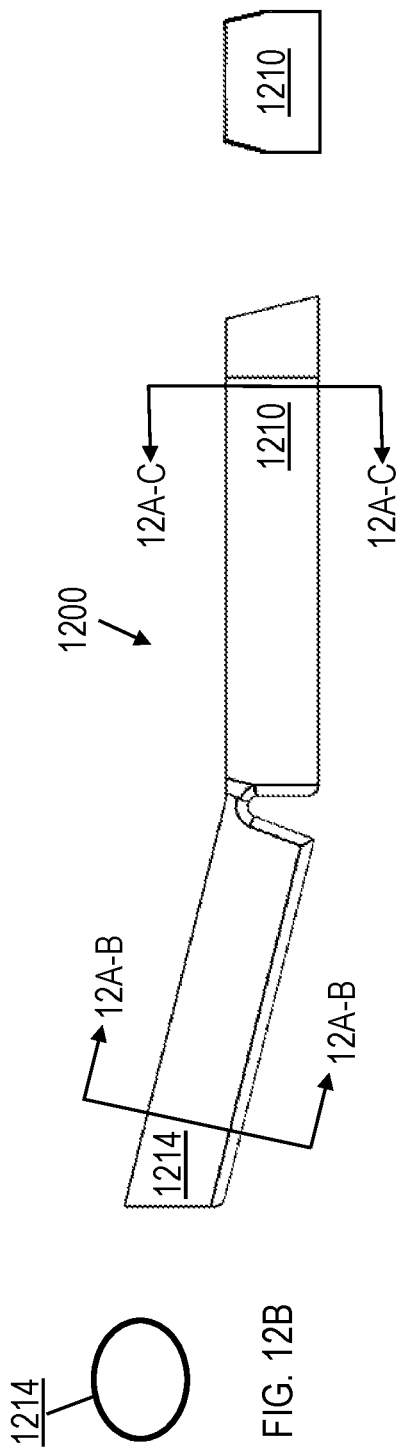

POP-UP PUSH STOP

FIELD OF THE INVENTION

The invention relates to a push stop for a workpiece. In particular, to a push stop that pops up under its own resilience to act as the stop, but which can readily be pressed entirely back into the slot and out of the way.

BACKGROUND OF THE INVENTION

Push stops are common in material working fields. For example, in woodworking, flip stops can be flipped into an out of a stop position on a fence. However, flip stops require manual repositioning frequently and are designed to work with select fences and the like. Other stops may require tools and fasteners to secure the stop in a selected position on a worksurface. These limitations can slow the cutting operations. Consequently, there is room in the art for improvement.

BRIEF DESCRIPTION OF DRAWINGS

The invention is explained in the following description in view of the drawings.

FIG. 1A to FIG. 1G are various views of an example embodiment of a pop-up push stop disclosed herein.

FIG. 4A and FIG. 4B show the pop-up push stop of FIG. 1A yielding to a workpiece.

FIG. 6 to FIG. 10 show various alternate example embodiments of the pop-up push stop.

FIG. 11A to FIG. 11D show alternate example embodiments of a pop-up push stop.

FIG. 12A to FIG. 12C show an alternate example embodiment of a pop-up push stop.

DETAILED DESCRIPTION OF THE INVENTION

The present inventors have devised a unique and innovative pop-up push stop for use in conjunction with a slot in a worksurface. The pop-up push stop ("pop stop") is configured to pop up out of the slot under its own resilience into a fixed raised position while still being anchored at any location in the slot. When popped up, the pop stop can act as a push stop for a workpiece pushed laterally against it. The pop stop is further configured to elastically yield when pushed down so that it fits entirely within the slot and is thereby completely out of the way. Once the external force is released, the pop stop returns to the same fixed raised position. Suitable slots can have any shape, including dovetail slots, T-slots, and the like. An example embodiment of the pop stop disclosed herein is configured to work with a dovetail slot formed by a conventional ½-inch dovetail router bit having 14-degree sidewalls. However, other sizes and shapes are within the scope of this disclosure.

Figure 1D:
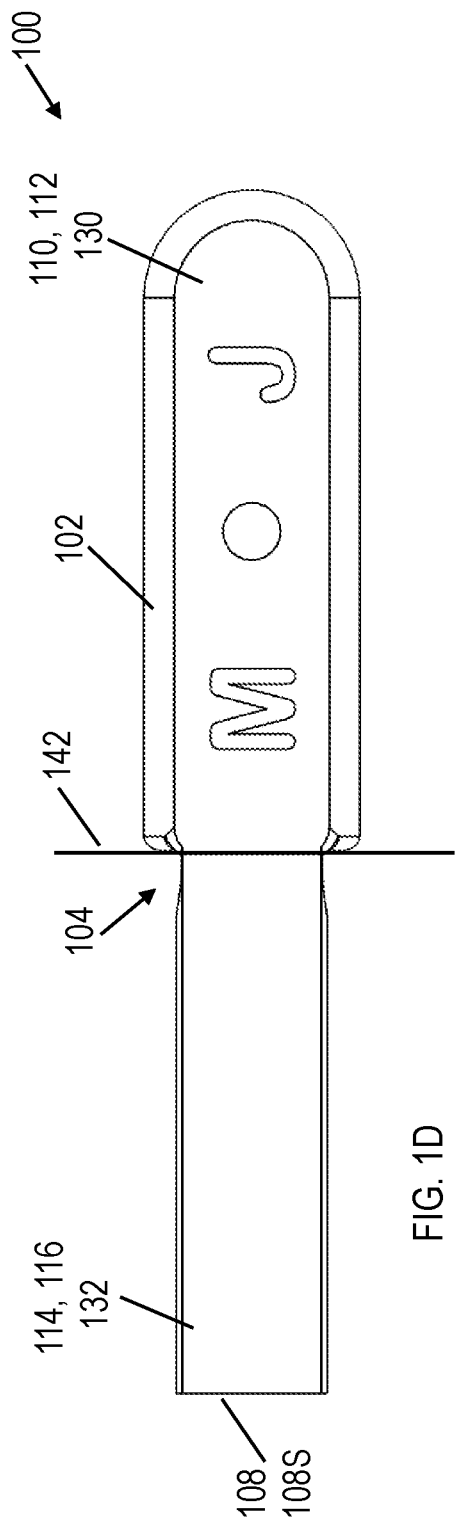
Figure 1E:
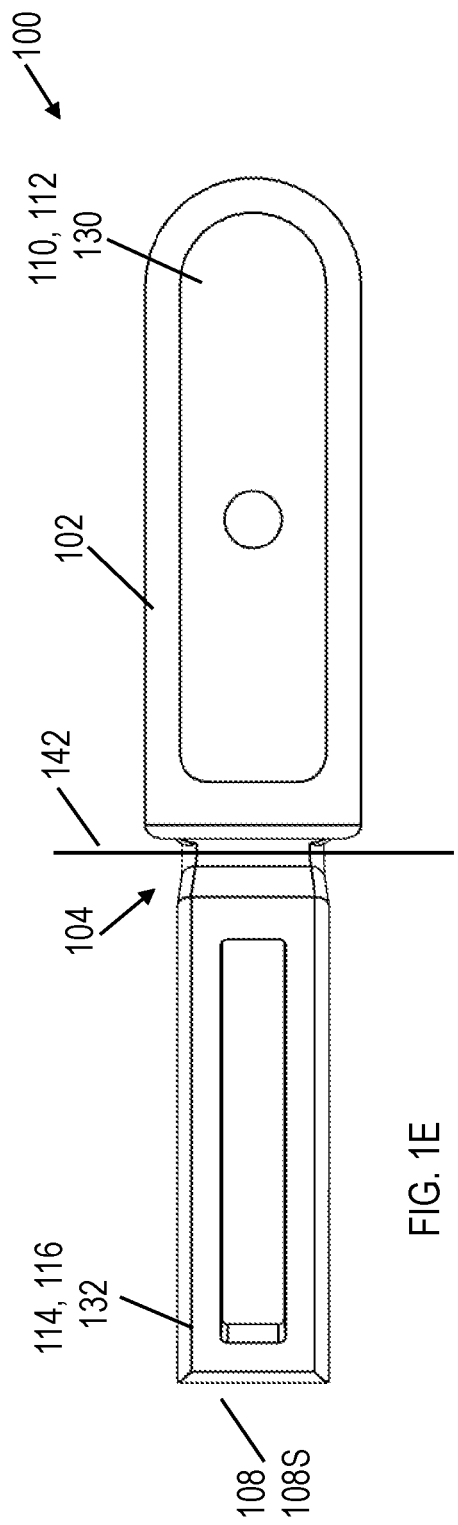
Figure 1G:
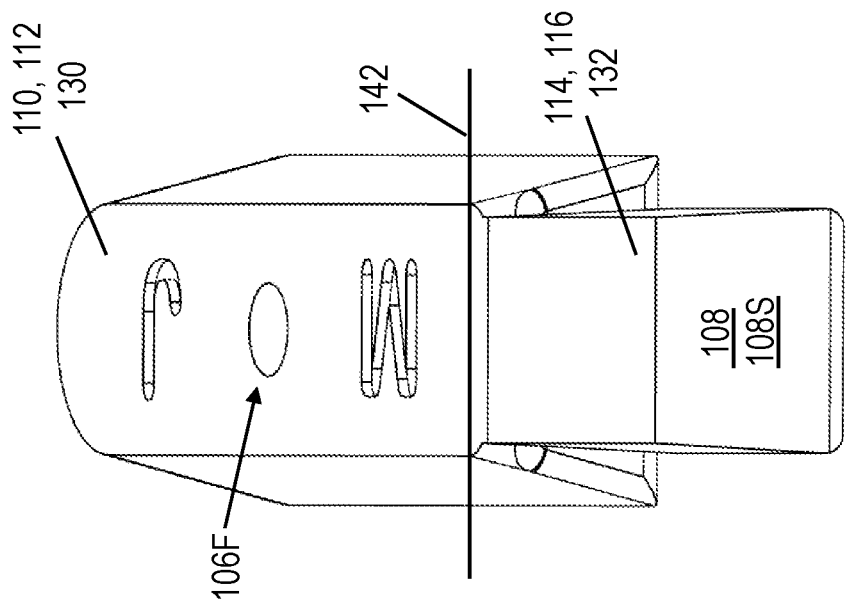
Figure 1F:
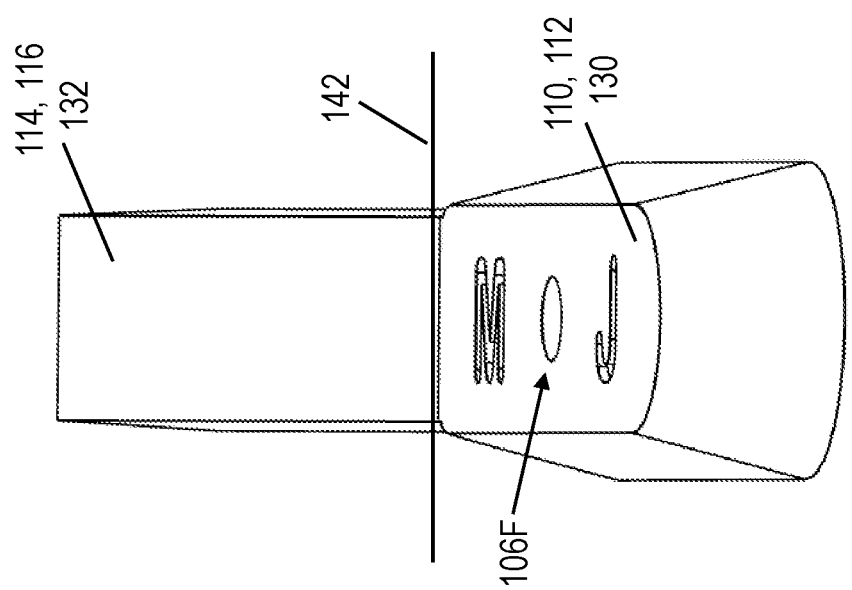

FIG. 1A and FIG. 1B are side views of an example embodiment of a pop-up push stop disclosed herein. FIG. 1C is a perspective view of the pop-up push stop of FIG. 1A. FIG. 1D is a top view of the pop-up push stop of FIG. 1A. FIG. 1E is a bottom view of the pop-up push stop of FIG. 1A. FIG. 1F is a perspective end view looking at a first terminus of the pop-up push stop of FIG. 1A. FIG. 1G is a perspective end view looking at a second terminus of the pop-up push stop of FIG. 1A.

Figure 2:
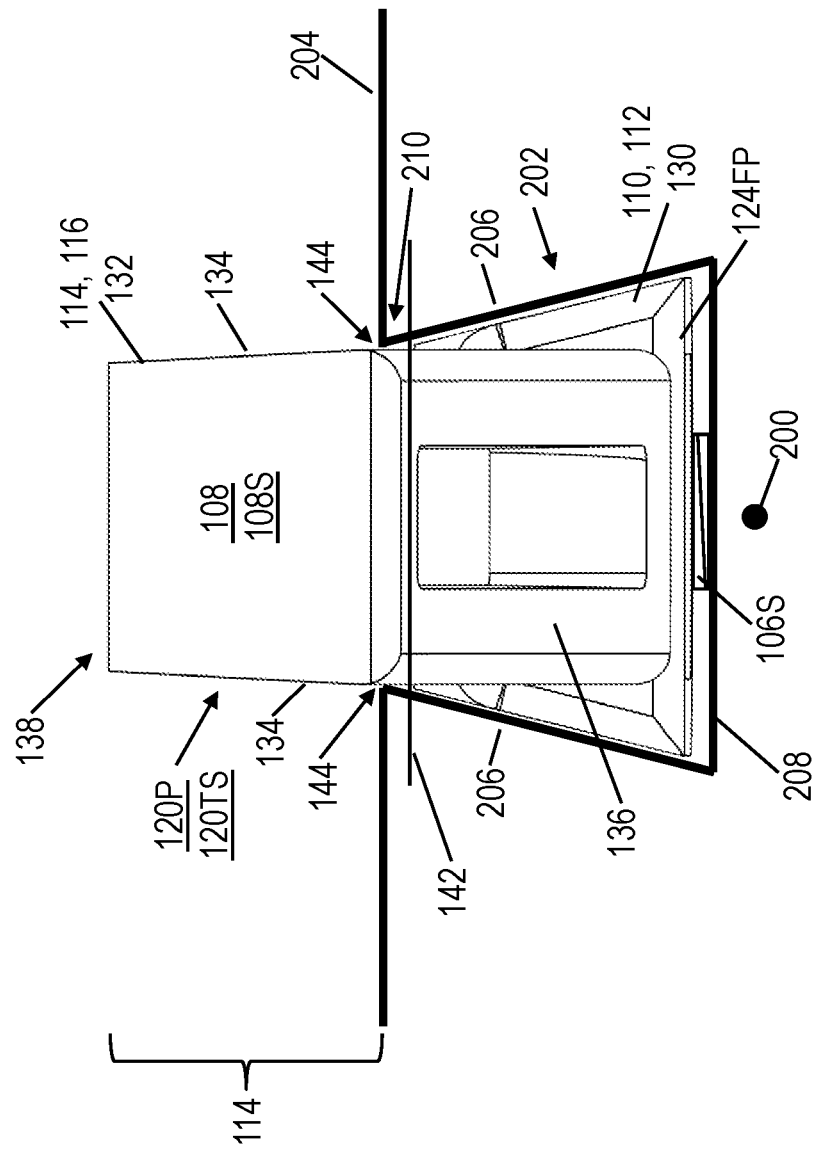
FIG. 2 shows the pop-up push stop of FIG. 1A in a slot.

FIG. 2 is a side view showing the pop-up push stop of FIG. 1A in a slot.

Figure 3A:
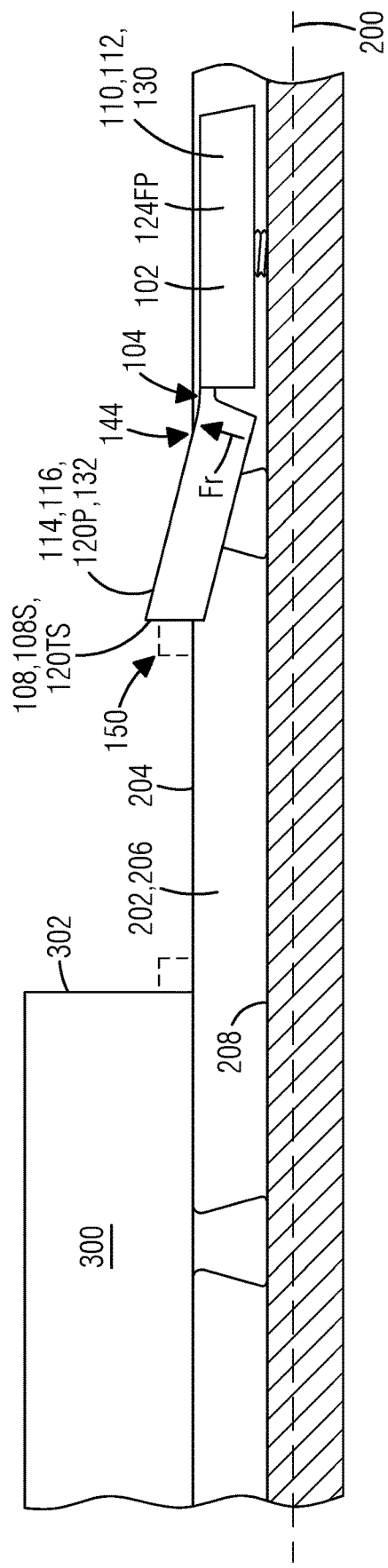
FIG. 3A and FIG. 3B show the pop-up push stop of FIG. 1A stopping a workpiece.
Figure 3B:
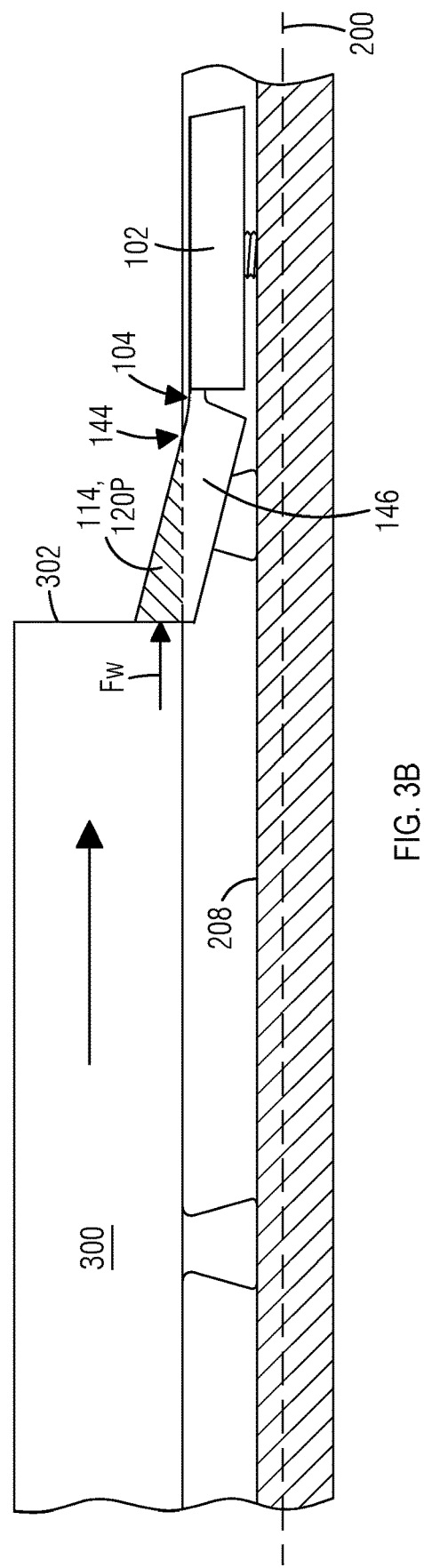

FIG. 3A and FIG. 3B show the pop-up push stop of FIG. 1A stopping a workpiece.

Broadly, the push stop 100 may include a body 102, a resilient element 104, an anchor assembly 106, and a terminal surface 108 of the body 102 that acts as a positive push stop 108S for a workpiece 300 on a worksurface 204. As can be seen in FIG. 1B, a resilient force Fr naturally exerted by the resilient element 104 urges a portion 114 of the body upward into a fixed raised position 120P in which the portion 114 of the body 102 protrudes beyond the worksurface 204. (See the portion 114 indicated with hatching in FIG. 3B.) Likewise, the resilient force Fr naturally exerted by the resilient element 104 urges the terminal surface 108 into a fixed raised position 120TS in which the terminal surface 108 protrudes beyond the worksurface 204.

When an external force Fe sufficient to overcome the resilient force Fr is applied downward onto the body 102, the protruding portion 114 of the body 102 and the associated terminal surface 108 can be pushed downward into a lowered position in which no portion of the push stop 100 protrudes from the slot. When pushed down like this, the portion 114 of the body is in a lowered position 122P and the terminal surface is in a lowered position 122TS.

The push stop 100 is configured to return the terminal surface 108 to the fixed raised position 120TS in the absence of the external force Fe. The anchor assembly 106 is configured to hold the terminal surface 108 in the fixed raised position 120TS.

When the portion 114 of the body 102 protrudes beyond the worksurface 204 in the fixed raised position 120P, other portions of the push stop 100 need not be entirely disposed within the slot 202. So long as the push stop 100 returns the terminal surface 108 to the same fixed raised position 120TS every time, the anchor assembly 106 holds the terminal surface 108 in the same location every time, and the entirety of the push stop 100 can be pushed downward into the slot 202, the functional criteria for the push stop 100 are met, regardless of how the push stop 100 is embodied/constructed.

In an implementation that is more specific than the broader example embodiment disclosed above, the construction of the push stop 100 may include an elongated, flexible, unipartite body 102 having a first portion 110 that defines a first terminus 112 of the body 102, the second portion 114 that defines a second terminus 116 of the body 102 and the terminal surface 108 of the body 102, and the resilient element 104.

As used herein, unipartite refers to one body whose constituents cannot be separated from each other. In this example embodiment, the unipartite body 102 is formed from a lone piece of plastic and includes the resilient element 104. The lone piece of plastic may be formed, for example, via a molding process. Alternately, the lone piece may be formed via an additive manufacturing processes or a subtractive process (e.g., machining). Suitable materials for the lone piece include but are not limited to nylon (e.g., nylon 6) with or without glass-fill, polyoxymethylene polycarbonate, polyethylene, ultra-high molecular weight polyethylene, urethane, rubber, spring steel, etc. In alternate example embodiments, any or all of the first body part 130, the second body part 132, and the resilient element 104 may be discrete components and each may be formed from the suitable materials listed above. Each of the discrete components may or may not be formed from the same material as the other components.

The resilient element 104 can be engineered to exert a desired resilient force and to move the second portion 112 through a desired range of motion by selecting parameters such as suitable dimensions together with a material having a suitable modulus of elasticity.

The anchor assembly 106 fixes the first portion 110 of the body 102 in a fixed anchored position 124FP relative to the slot 202. This prevents translation of the second portion 114 of the body 102 and translation of the terminal surface 108 along the longitudinal axis 200 of the slot 202. The resilient force Fr exerted by the resilient element 104 urges the second portion 114 and the terminal surface 108 upward into the fixed raised positions 120P, 120TS.

When a workpiece force Fw (see FIG. 3B) is applied to the terminal surface 108 by a workpiece 300, an optional physical interference between sidewalls 206 of the slot 202 and the body 102 prevents the second portion 114 and the terminal surface 108 from being lifted out of the fixed raised positions 120P, 120TS when the workpiece force Fw is applied. The anchor assembly 106 and the physical interference between sidewalls 206 of the slot 202 and the body 102 thereby lock the second portion 114 and the terminal surface 108 into the fixed raised positions 120P, 120TS when the workpiece force Fw is applied. When the external force Fe is applied, the second portion 114 with its terminal surface 108 can be pushed downward until no part of the push stop 100 protrudes beyond the worksurface 204. The first portion 110, the second portion 114, the resilient element 104, and the anchor assembly 106 may be embodied in a variety of ways.

The example embodiment shown in FIG. 1A to FIG. 3A, is an even more specific implementation of the broader example embodiments disclosed above. In this even more specific implementation, the unipartite body 102 includes a first body part 130 and a second body part 132 disposed end-to-end with each other and joined by the integral resilient element 104. The first body part 130 includes the first portion 110 of the body 102 and the first terminus 112 of the body 102. In this example embodiment, the entirety of the first body part 130 is the first portion 110 of the body 102 that is anchored by the anchor assembly 106 and the first body part 130 is disposed entirely in the slot 202.

The anchor assembly 106 includes female threads 106F in the first body part 130 and a set screw 106S configured to cooperate with the female threads 106F to anchor the first body part 130 in the slot 202. When tightened, the set screw 106S abuts a bottom surface 208 of the slot 202. This lifts the first body part 130 until the first body part 130 abuts the sidewalls 206 of the slot 202. This action fixes the first body part 130 and thereby the first portion 110 of the body 102 in the fixed anchored position 124FP relative to the slot 202 in all degrees of freedom.

The second body part 132 includes the second portion 114 of the body 102, the second terminus 116 of the body 102, and the terminal surface 108 of the body 102. In this example embodiment, only some of the second body part 132 protrudes beyond the worksurface 204 when the second portion 114 is in the fixed raised position. Consequently, only a some of the second body part 132 is the second portion 114 of the body 102 that protrudes beyond the worksurface 204.

The resilient element 104 forms a pivot joint 140 that joins an upper corner 130C of the first body part 130 with an upper corner 132C of the second body part 132. The resilient element 104 enables the second body part 132 to pivot as indicated by the double arrow in FIG. 1B about an axis of rotation 142 that is parallel to the worksurface 204 and perpendicular to the longitudinal axis 400 of the slot 402. This pivoting of the second body part 132 moves the second portion 114 into and out of the fixed raised position 120P.

The optional physical interference that locks the second portion 114 and the terminal surface 108 into the fixed raised positions 120P, 120TS occurs at one or more contact points 144 where the second body part 132 abuts the sidewalls 206 of the slot 202. The contact points 144 can be at any location on the body 102. Since the intersections of the sidewalls 206 of the slot 202 and the worksurface 204 are likely to be rounded, the body is likely to encounter the sidewalls 206 at a location below the worksurface 204. The contact points 144 are thereby likely to be disposed on a part of the body 102 that does not protrude beyond the worksurface 204.

In an example embodiment and as can best be seen in FIG. 2, sidewalls 134 of the second body part 132 taper inward toward each other from a bottom 136 of the second body part 132 to a top 138 of the second body part 132. This tapering centers the second body part 132 and hence the terminal surface 108 in a mouth 210 of the slot 202 as the terminal surface 108 moves upward into the fixed raised position 120TS.

A remainder 146 of the second body part 132 (see FIG. 3B) is simply part of the body 102 that is disposed between the first portion 110 of the body 102 that is anchored by the anchor assembly 106 and the second portion 114 of the body 102 that can protrude beyond the worksurface 204. In this example embodiment, the remainder 146 moves when the second portion 114 moves relative to the first portion 110.

In various alternate example embodiments, there may be no parts of the body 102 between the first portion 110 of the body 102 and the second portion 114 of the body 102. Alternately, there may be more than one part of the body 102 between the first portion 110 of the body 102 and the second portion 114 of the body 102. In these various alternate example embodiments, any parts between the first portion 110 of the body 102 and the second portion 114 of the body 102 may or may not move when the second portion 114 moves relative to the first portion 110.

In an example embodiment, at least a part of the first portion 110 includes a dovetail shape configured to match a slot 402 having a dovetail shape made by a conventional ½-inch dovetail router bit having 14-degree sidewalls. In this way, when the set screw 106S raises the dovetail shaped part of the first portion 110, the dovetail shaped part of the first portion 110 will lock into place with the sidewalls of the dovetail shaped slot 202. This cooperation between the dovetail shape of the first portion 110 and the dovetail shape of the slot 202 not only locks in the location of the terminal surface 108 along the longitudinal axis 200 of the slot 202, but it locks the terminal surface 108 into a proper upright position relative to the worksurface 204.

In the example embodiment shown, the entire first body part 130 has this dovetail shape. However, this is not necessary. The dovetail shape may extend only along a part or all of a longitudinal length of the first portion 110. Likewise, the dovetail shape may extend only along a part or all of a height of the first portion 110.

In an example embodiment and as best seen in FIG. 3A, when the second portion 114 is in the fixed raised position 120P, the terminal surface 108 is oriented at an angle 150 of ninety (90) degrees to the worksurface 204. When the terminal surface 108 is perpendicular to the worksurface 204 like this, the terminal surface 108 can sit flush with a sidewall 302 of the workpiece 300 when the sidewall 302 is also perpendicular to the worksurface 204.

In FIG. 3A and FIG. 3B, the second portion 114 is in the fixed, raised position due to the resilience of the resilient element 104. The first portion 110 is fixed in the fixed anchored position 124FP by the anchor assembly 106. The workpiece 300 is moved from left to right until the sidewall 302 of the workpiece 300 abuts the terminal surface 108 with a workpiece force Fw. The workpiece force Fw pushes on the terminal surface 108 and the interference between the second body part 132 and the contact points 144 counters the workpiece force Fw. This locks the second portion 114 and the terminal surface 108 into the fixed raised positions 120P, 120TS which, in turn, stops the workpiece 300.

In an alternate example embodiment, there is no contact between the second body part 132 and the contact points 144. Instead, the second body part 132 is configured to naturally stop itself in the fixed raised position 120P, which stops the terminal surface 108 in the fixed raised position 120TS. Friction between the terminal surface 108 and the sidewall 302 helps hold the second portion 114 in the fixed raised position 120P which, in turn, helps stop the workpiece 300.

In an example embodiment and as best seen in FIG. 4A to FIG. 4B, the top 138 of the second body part 132 is also an upper surface of the second portion 114 that protrudes beyond the worksurface 204. When the second portion 114 is in the fixed raised position 120P, at least part of the upper surface 138 ramps upward from the worksurface 204 toward the terminal surface 108 at an angle 138A. When the workpiece 300 moves from right to left as indicated by the arrow, a leading corner 304 of the workpiece 300 contacts and the ramped upper surface 138 of the second portion 114. As the corner 304 rides along the ramped upper surface 138 the second portion 114 progressively yields downward in a smooth motion until the second portion 114 reaches the lowered position 122P.

Figure 5:
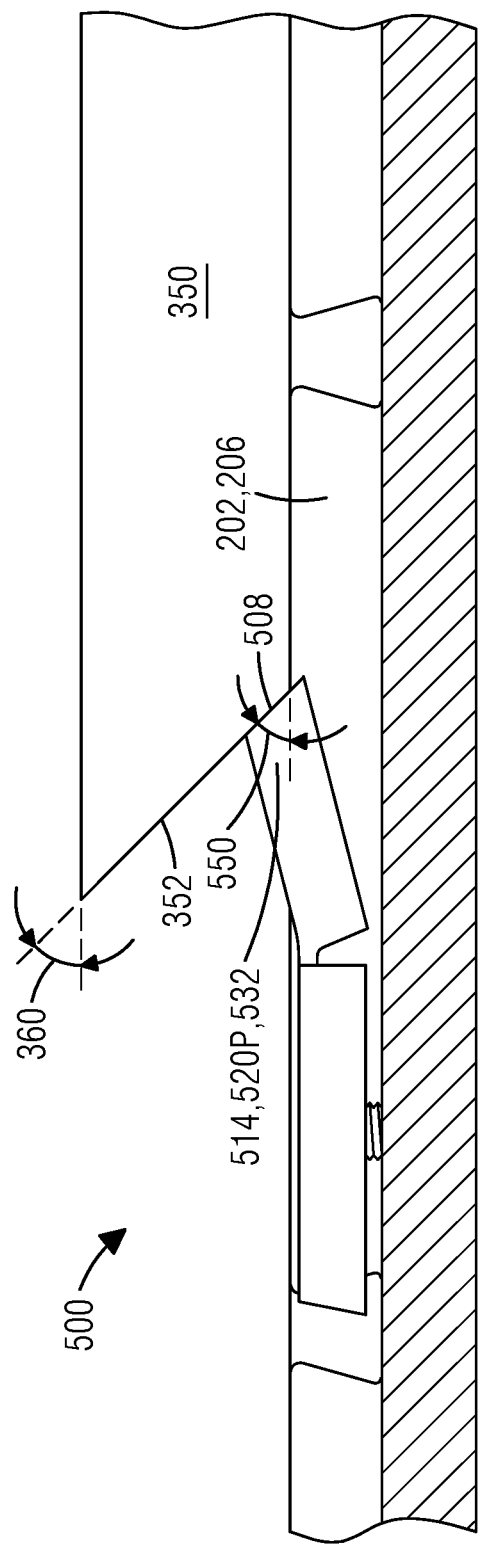
FIG. 5 shows an alternate example embodiment of a pop-up push stop stopping a workpiece.

FIG. 5 shows an alternate example embodiment of the push stop 500. In this example embodiment, when the second portion 514 is in the fixed raised position 520P, the terminal surface 508 is oriented at an angle 550 of forty-five (45) degrees to the worksurface 204. A line formed by an intersection of the terminal surface 508 and the worksurface 204 is oriented perpendicular to the longitudinal axis 200 of the slot 202. When the terminal surface 508 is angled like this, the terminal surface 508 can sit flush with a sidewall 352 of the workpiece 350 when the sidewall 352 of the workpiece 350 is also at an angle 360 of forty-five (45) degrees to the worksurface 204. As with the example embodiment of FIG. 3A to FIG. 3B, there may or may not be contact points between the second body part 532 and sidewalls 206 of the slot 202. Further, friction between the terminal surface 508 and the sidewall 352 may aid in holding the second portion 514 in the fixed raised position 520P.

Figure 6:
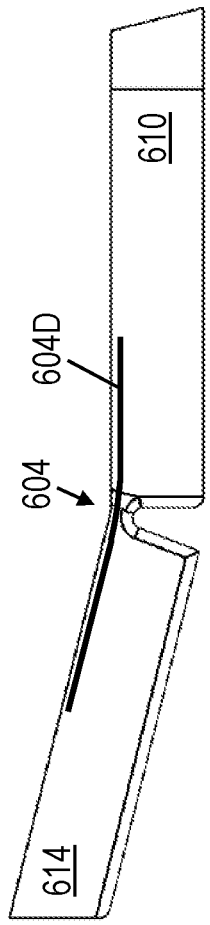

FIG. 6 shows an alternate example embodiment of the push stop 600. In this example embodiment, the first portion 610 is connected to the second portion 614 via a resilient element 604 like the resilient element 104 disclosed in the example embodiment of FIG. 1A. A discrete resilient element 604D is disposed in or on the body 602 to supplement the resilient force exerted on the second portion 614. The discrete resilient element 604D may be, for example, a strip of metal and it may be replaceable.

Figure 7:
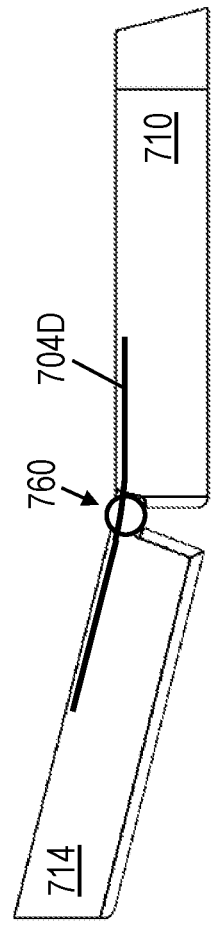

FIG. 7 shows an alternate example embodiment of the push stop 700. In this example embodiment, the first portion 710 is connected to the second portion 714 via a pivot connection 760. The connection 760 is a simple joint that does not exhibit its own resilience. The discrete resilient element 704D is disposed in or on the body 702 to supply the resilient force exerted on the second portion 714. The discrete resilient element 704D may be, for example, a strip of metal and it may be replaceable.

FIG. 8 shows an alternate example embodiment of the push stop 800. In this example embodiment, the first portion 810 is connected to the second portion 814 via a resilient element 804 like the resilient element 104 disclosed in the example embodiment of FIG. 1A. The discrete resilient element 804D is disposed between the first portion 810 and the second portion 814 in compression to supplement the resilient force exerted on the second portion 814.

FIG. 9 shows an alternate example embodiment of the push stop 900. In this example embodiment, the first portion 910 is connected to the second portion 914 via a pivot connection 960. The connection 960 is a simple joint that does not exhibit its own resilience. The discrete resilient element 904D is disposed between the first portion 910 and the second portion 914 in compression to supply the resilient force exerted on the second portion 914.

FIG. 10 shows an alternate example embodiment of the push stop 1000. In this example embodiment, the first portion 1010 is discrete from the second portion 1014. A resilient pivot element 1004C is discrete from both the first portion 1010 and the second portion 1014 and supplies the pivot connection between the first portion 1010 and the second portion 1014 as well as the resilient force exerted on the second portion 1014.

While the first portion and the second portion have been disclosed above as having certain respective shapes, a variety of other shapes are possible. FIG. 11A to FIG. 12C show alternate example embodiments of a push stop with differing shapes for the first portion and the second portion.

FIG. 11B shows a section taken along 11A-B of FIG. 11A. When so viewed, at least part of the second portion 1114 has a circular shape, optionally including the terminal surface.

FIG. 11C shows a section taken along 11A-C of FIG. 11A. When so viewed, at least part of the first portion 1110 has a dovetail shape that is sufficient to cooperate with the dovetail shaped slot. However, the dovetail shape is limited to less than a full height of the part of the first portion 1110 and is disposed toward the bottom of the first portion 1110.

FIG. 11D shows a section taken along 11A-C of a variant of FIG. 11A. When so viewed, at least part of the first portion 1110 has a T shape that is configured to cooperate with a conventional dovetail shaped slot.

FIG. 12B shows a section taken along 12A-B of FIG. 12A. When so viewed, at least part of the second portion 1214 has an oval shape, optionally including the terminal surface.

FIG. 12C shows a section taken along 12A-C of FIG. 12A. When so viewed, at least part of the first portion 1210 has a dovetail shape that is sufficient to cooperate with the dovetail shaped slot. However, the dovetail shape is limited to less than a full height of the part of the first portion 1210 and is disposed toward the top of the first portion 1110.

The shape of the first portion can be configured to accommodate a wide range of slot shapes not explicitly disclosed herein but considered within the scope of the disclosure. Similarly, the shape of the second portion and/or the terminal surface can be configured in a wide variety of ways. For example, the terminal surface need not be flat.

Instead, it may have points or other fixing means to assist in holding a workpiece in place. Alternately, or in addition, it may be shaped in three dimensions to cooperate with three dimensional features in the sidewalls of workpieces etc.

Figure 13C:
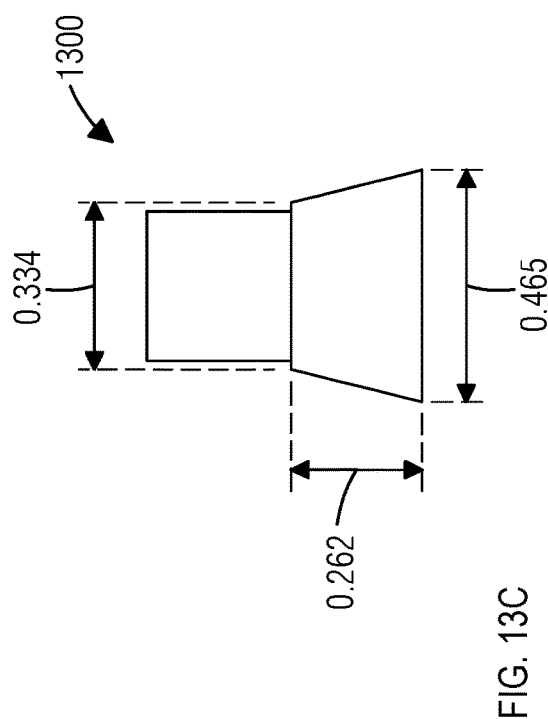
FIG. 13A to FIG. 13E show an alternate example embodiment of a pop-up push stop.
Figure 13B:
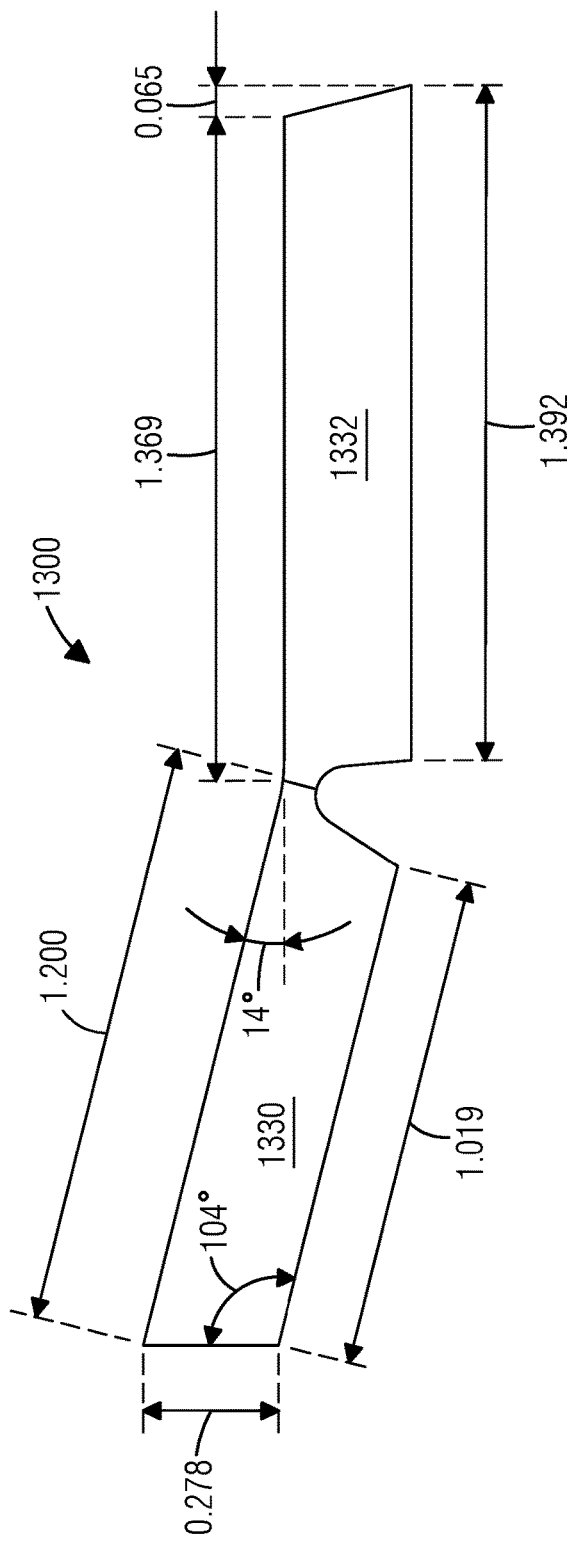
Figure 13A:
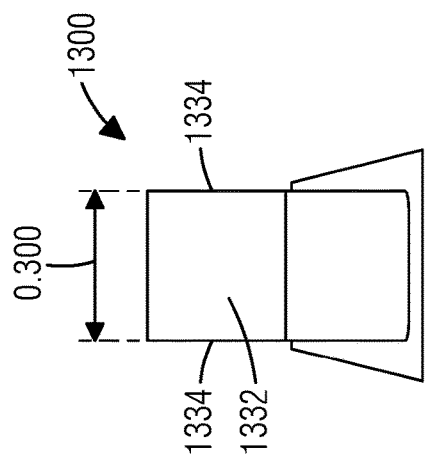
Figure 13D:
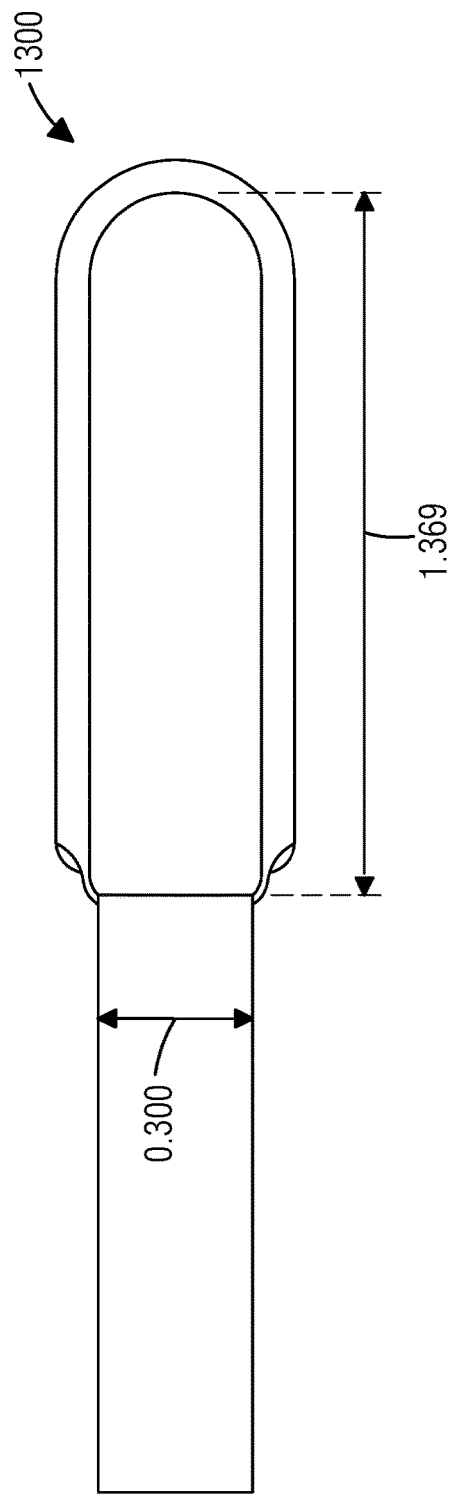
Figure 13E:
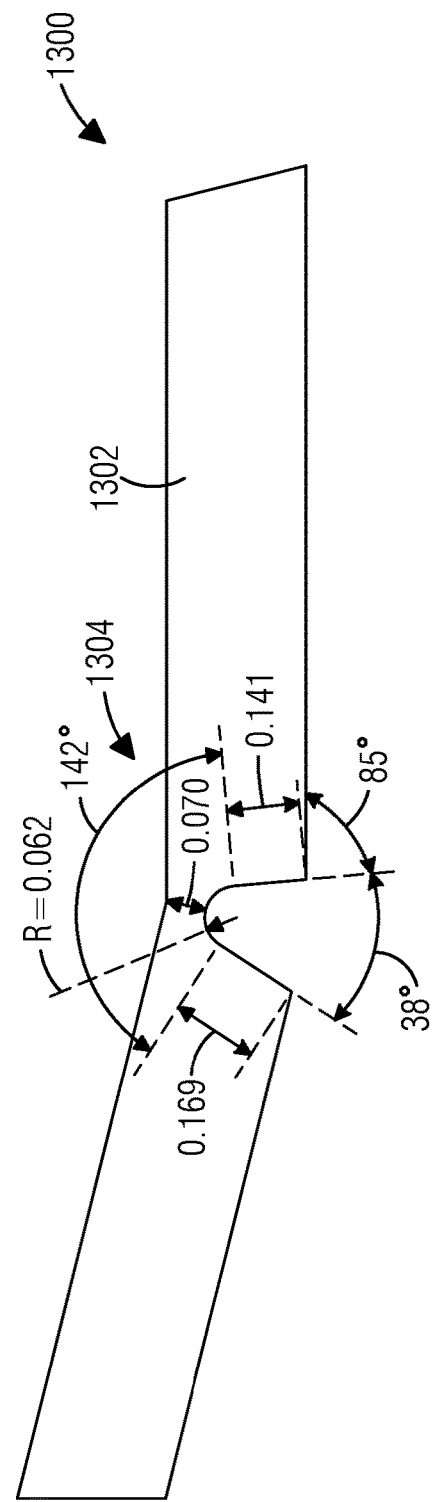

FIG. 13A to FIG. 13E show an alternate example embodiment of the push stop 1300 with dimensions. As can be seen best in FIG. 13A, in this example embodiment, the sidewalls 1334 of the second body part 132 do not taper. Instead, they are parallel to each other. FIG. 13B shows the push stop 1300 in a fully unflexed state in which the second body part 1332 has reached a state of equilibrium relative to the first body part 1330 in the absence of any external forces. FIG. 13E shows details of the resilient element 1304 (e.g., a resilient portion of the body 1302). In this example embodiment, the cross-sectional thickness of the resilient element 1304 is 0.070 inches. However, the cross-sectional thickness may be at least as low as 0.062 inches up to at least 0.093 inches.

The present inventors have devised a push stop that is very simple to use, is inexpensive, requires virtually no maintenance, and improves on the stops of the prior art. Consequently, the push stop disclosed herein represents an improvement on the art.

The invention claimed is:

1. A push stop for use in a slot disposed in a worksurface, comprising:
a body, a resilient element, and an anchor assembly, the anchor assembly being configured to anchor a first portion of the body in a fixed anchored position within the slot;
wherein a resilient force exerted by the resilient element urges a second portion of the body into a fixed raised position in which the second portion protrudes beyond the worksurface; and
wherein when an external force sufficient to overcome the resilient force is applied, the resilient element yields until none of the second portion protrudes beyond the worksurface.

2. The push stop of claim 1,
wherein the push stop comprises a flexible unipartite body comprising the body and the resilient element; and
wherein the second portion defines a terminal surface of the second portion.

3. The push stop of claim 2,
wherein when the second portion is in the fixed raised position, the terminal surface is oriented perpendicular to the worksurface and perpendicular to the slot.

4. The push stop of claim 2,
wherein the flexible unipartite body is configured such that when a workpiece force is applied to the terminal surface, a physical interference between the flexible unipartite body and upper corners of the slot prevents the second portion from being lifted out of the fixed raised position.

5. The push stop of claim 2,
wherein when the second portion is in the fixed raised position, the terminal surface is oriented at 45 degrees to the worksurface and a line formed by an intersection of the terminal surface and the worksurface is oriented perpendicular to the slot.

6. The push stop of claim 2,
wherein when the second portion is in the fixed raised position, an upper surface of the second portion ramps upward from the worksurface toward the terminal surface.

7. The push stop of claim 2,
wherein the anchor assembly comprises female threads through the first portion and an associated set screw.

8. The push stop of claim 2, the flexible unipartite body further comprising:
a first body part comprising the first portion; and
a second body part that comprises the second portion and that is disposed end-to-end with the first body part;
wherein the resilient element enables the second body part to move relative to the first body part to move the second portion in and out of the fixed raised position.

9. The push stop of claim 8,
wherein the resilient element comprises a resilient connection between the first body part and the second body part.

10. The push stop of claim 9,
wherein the resilient connection defines a pivot joint between the first body part and the second body part.

11. The push stop of claim 10,
wherein the pivot joint is disposed between an upper corner of the first body part and an adjacent upper corner of the second body part.

12. The push stop of claim 8,
wherein the first body part comprises tapered a dovetail shape configured to cooperate with a ½" wide dovetail shaped slot with 14-degree tapered walls.

13. The push stop of claim 1,
wherein the resilient element is discrete from the first portion and the second portion.

14. The push stop of claim 13,
wherein the resilient element defines a pivot joint between the first portion and the second portion.

15. A push stop for use in a slot disposed in a worksurface, comprising:
a first body part that is configured to fit within the slot and entirely below the worksurface;
an anchor assembly configured to anchor the first body part in a fixed anchored position within the slot;
a second body part that is positioned end-to-end with the first body part and configured to move between a fixed raised position in which at least a portion of the second body part protrudes above the worksurface and a lowered position in which none of the second body part protrudes above the worksurface; and
a resilient element configured to urge the second body part into the fixed raised position and also configured to elastically yield to allow the second body part to be pushed into the lowered position by an external force.

16. The push stop of claim 15,
wherein when the second body part is in the fixed raised position, a workpiece force applied to a terminal surface of the second body part is countered by a physical interference between the second body part and upper corners of the slot to prevent the second body part from being lifted out of the fixed raised position.

17. The push stop of claim 15,
wherein applying the external force to an upper surface of the second body part causes the second body part to be pushed into the lowered position.

18. The push stop of claim 17,
wherein when the second body part is in the fixed raised position the upper surface ramps upward from the worksurface toward a terminal surface of the second body part.

19. The push stop of claim 15,
wherein the resilient element defines a pivot joint between the first body part and the second body part that enables the second body part to pivot relative to the first body part when the second body part moves into and out of the fixed raised position.

20. The push stop of claim 19, wherein the pivot joint defines a pivot axis that is perpendicular to the slot and parallel to the worksurface.

21. The push stop of claim 15, wherein when the second body part is in the fixed raised position, a terminal surface of the second body part is oriented perpendicular to the worksurface and perpendicular to the slot.

22. The push stop of claim 15, wherein the first body part and the second body part each comprise a tapered a dovetail shape configured to cooperate with a ½" wide dovetail shaped slot with 14-degree tapered walls.

23. A push stop, for use in a slot disposed in a worksurface, comprising:

a body, a resilient element, an anchor assembly, and a terminal surface that acts as a positive stop for a workpiece on the worksurface;

wherein a resilient force exerted by the resilient element urges the terminal surface of the body into a fixed raised position in which the terminal surface protrudes beyond the worksurface;

wherein when the terminal surface is in the fixed raised position the anchor assembly holds the terminal surface in the fixed raised position; and wherein when an external force sufficient to overcome the resilient force is applied, the resilient element yields until none of the push stop protrudes beyond the worksurface.

24. The push stop of claim 23, wherein the body comprises a first portion at a first terminus of the body and a second portion at a second terminus of the body;

wherein the anchor assembly is configured to anchor the first portion of the body in a fixed position relative to a longitudinal axis of the slot to hold the terminal surface in the fixed raised position; and wherein the resilient element is configured to raise the second portion of the body relative to the first portion of the body to raise the terminal surface into the fixed raised position.

\* \* \* \* \*